United States Patent [19]
Yokomatsu et al.

[11] Patent Number: 5,150,925
[45] Date of Patent: * Sep. 29, 1992

[54] HOSE FITTING

[75] Inventors: Takahiro Yokomatsu; Kenji Mine; Shinichiro Kato, all of Tokyo, Japan

[73] Assignee: Bridgestone Flowtech Corporation, Tokyo, Japan

[*] Notice: The portion of the term of this patent subsequent to Jan. 15, 2008 has been disclaimed.

[21] Appl. No.: 587,975

[22] Filed: Sep. 25, 1990

[51] Int. Cl.⁵ .............................................. F16L 33/16
[52] U.S. Cl. .................................... 285/101; 285/104; 285/323; 285/243
[58] Field of Search ..................... 285/86, 18, 259, 95, 285/323, 104, 101, 12

[56] References Cited

U.S. PATENT DOCUMENTS

| | | | |
|---|---|---|---|
| 1,428,949 | 9/1922 | Eastman . | |
| 2,120,275 | 6/1938 | Cocoles | 285/86 |
| 2,407,745 | 9/1946 | Jacobson | 285/97.3 |
| 2,430,174 | 8/1947 | Yost | 285/97.3 |
| 2,466,526 | 4/1949 | Wolfram | 285/86 |
| 3,097,866 | 7/1963 | Iverson | 285/18 |
| 3,409,314 | 11/1968 | Roe | 285/322 X |
| 3,999,783 | 12/1976 | Legris | 285/243 X |
| 4,157,843 | 6/1979 | Trnka | 285/259 |
| 4,212,487 | 7/1980 | Jones et al. | 285/95 |
| 4,220,359 | 9/1980 | Evenson et al. | 285/259 X |
| 4,229,029 | 10/1980 | Boyer et al. | 285/323 X |
| 4,282,175 | 8/1981 | Volgstadt et al. | 285/104 X |
| 4,431,216 | 2/1984 | Legris | 285/104 |
| 4,445,714 | 5/1984 | Kisiel | 285/323 X |
| 4,498,691 | 2/1985 | Cooke | 285/12 |
| 4,712,813 | 12/1987 | Passerell et al. | 285/323 X |
| 4,775,171 | 10/1988 | Marshall | 285/101 |

FOREIGN PATENT DOCUMENTS

| | | |
|---|---|---|
| 406205 | 3/1946 | France . |
| 81547 | 8/1963 | France ................. 285/323 |
| 520608 | 3/1955 | Italy . |
| 678423 | 12/1964 | Italy . |
| 495698 | 11/1938 | United Kingdom . |

Primary Examiner—Randolph A. Reese
Assistant Examiner—Heather Chun
Attorney, Agent, or Firm—Lane, Aitken & McCann

[57] ABSTRACT

A hose fitting comprising a first cylindrical member having a small diameter bore portion and a large diameter bore portion connected to the small diameter bore portion, a second cylindrical member axially slidable within the large diameter bore portion and having a radial flange portion and an axial tubular portion extending from the radial flange portion, a sleeve provided within the large diameter bore portion and having an inclined surface, a collet provided between the second cylindrical member and the sleeve and having an outer surface engageable with the inclined surface of the sleeve, the collet being further formed at its inner circumferential portion with an inner circumferential edge, the inner circumferential edge being adapted to bite on the hose when no internal fluid pressure is applied within the small diameter bore portion and when the hose is pulled out axially outwardly, the hose being firmly fixed between the collet and the second cylindrical member by axial outward movement of the collet when an internal fluid pressure is applied within the small diameter bore portion, and a stop member received in the large diameter bore portion and adapted to limit axial movement of the sleeve and collet.

11 Claims, 7 Drawing Sheets

FIG. 8(a)
FIG. 8(b)
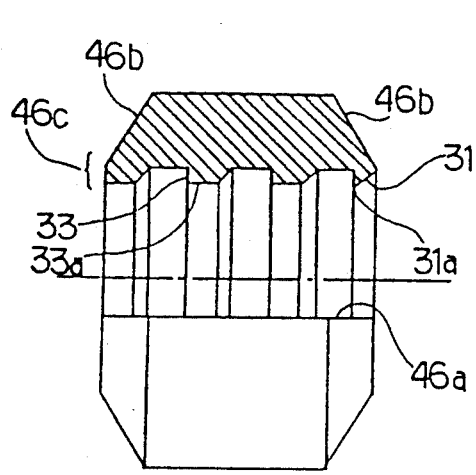
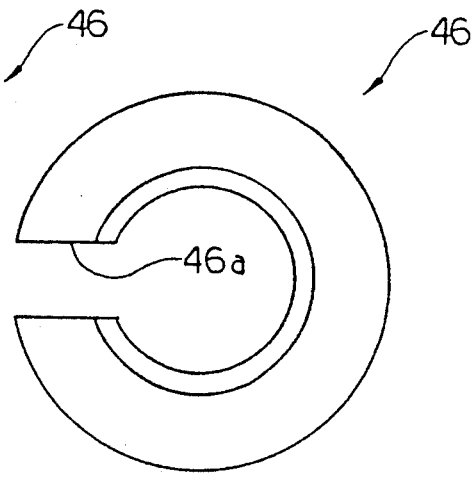
FIG. 9
FIG. 10
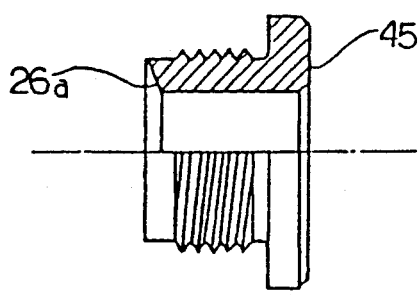
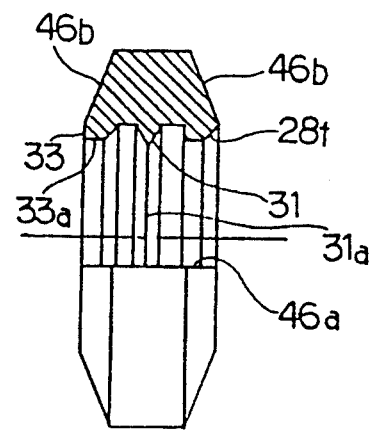

HOSE FITTING

FIELD OF THE INVENTION

The present invention relates in general to hose fittings, and in particular to hose fittings which require no crimping tool in connecting a hose of composite construction comprising an inner tube, an intermediate reinforcing layer and an outer cover.

The invention especially relates to a quick hose fitting in which, once a hose is inserted into the hose fitting, the hose will not come out of the fitting even if oil is attached on the hose, and in which connecting parts are not needed in connecting the hose fitting to another apparatus and in which no twisting occurs in the hose.

DESCRIPTION OF THE PRIOR ART

A hydraulic hose employed in the fluid passageway of high-pressure fluid having a relatively high pressure of more than 30 kg/cm$^2$ is normally a composite construction and comprises an inner tube, an intermediate reinforcing layer and an outer cover. There are two kinds of hose fittings used in the connection of such a hose thereto; one is a crimping type and another is a noncrimping type.

A conventional hose fitting of the former type is shown in FIG. 13. In FIG. 13, a hose fitting 1 comprises a core member 2 and a crimping member 3 attached to the core member 2. A hose 8, which is comprised of an inner tube 5, an intermediate reinforcing layer 6 and an outer cover 7, is inserted into between the crimping member 3 and the axial tubular portion 2a of the core member 2. The crimping member 3 of the hose fitting 1 is then crimped by crimping tools in the hose workshop. For this reason, a hose fitting such as this has the disadvantages that special crimping tools are required in the connection of the hose to the fitting and that the fitting cannot be used in a job site where the length adjustment of the hose 8 is required.

A conventional hose fitting of the noncrimping type is shown in FIGS. 14(a) and 14(b). In FIGS. 14(a) and 14(b), a hose fitting 11 is a reusable one and comprises a core member 12 having a male thread 12a, and a crimping member 13 having an internally threaded portion 13b which mates with the male thread 12a of the core member 12. In the connection of the hose 8 of composite construction to the hose fitting 11, the internally threaded portion 13b of the crimping member 13 is first screwed on the outer circumferential portion of the hose 8 by a vice, etc., and then the tubular portion 12a of the core member 12 is screwed into the hose 8 by a spanner, etc. to complete the connection. A hose fitting such as this, however, has its disadvantages in that suitable crimping tools such as vices, spanners and the like are required in the connection and that the efficiency of work is not satisfactory because it takes a long time to complete the connection.

FIG. 15 shows a conventional quick hose fitting described in Japanese Utility Model laid-open publication No. 55-98888 and Japanese Utility Model publication No. 61-4796. The quick hose fitting 15 has a cylindrical fitting body 16, an annular sealing ring 18 for sealing a monolayer tubing 17 inserted within the fitting body 16, and a chuck 19 for gripping the tubing 17. The fluid within the tubing 17 is sealed by the radially inward pressing engagement of the sealing ring 18 with the tubing 17. For this reason, if a hose of composite construction is connected to the known quick hose fitting of the above type, the hose is caused to bulge by the fluid that entered the reinforcing layer of the hose and there is an occurrence of a fluid leak, because the reinforcing layer is made from braided fibers and thus has spaces between the fibers. The tubing 17 is gripped by the sharp claw portion 19a of the chuck 19 having substantially no axial length. For this reason, the quick hose fitting 15 tends to tear the outer cover of the tubing 17 and disconnect the tubing 17 therefrom, and therefore cannot be adapted to the composite hose. Further, the quick hose fitting 15 was one that cannot be used in a system generating a fluid pressure of more than 30 kg/cm$^2$, by reason that the pressure resistance of the hose fitting 15 itself is relatively low and that the hose fitting 15 is designed to be used in a hose of monolayer construction under a pressure of less than 20 kg/cm$^2$.

Also, there is another conventional hose fitting proposed in Japanese Utility Model publication No. 58-17193. This fitting is constructed such that a tube end is gripped between the bulged portion of an axially slidable cylindrical member located inside the tube and the crimping finger located outside the tube, by the axial outward movement of the cylindrical member. However, if the repeated rupture pressure of fluid exceeds more than 30 kg/cm$^2$, the repeated stresses are concentrated upon the bulged portion and the crimping finger, since the bulged portion and crimping finger each have substantially no axial length. Finally, there will be an occurrence of the tear of the hose and an occurrence of the disconnection of the hose from the fitting.

When only the damaged portion of a hose is repaired in an apparatus having a high-pressure piping system that portion is first removed. After connectors are attached to the ends of the two remaining hoses by a crimping tool, it is necessary to connect the hose ends together. For this reason, the two remaining hoses must be removed from the apparatus in order to attach the connectors to the hoses by crimping and it was necessary to rearrange the piping system after the attachment of the connectors to the hoses. Thus, there was the disadvantage of requiring substantial labor and time. In the case of a new hose, there is also the drawback that, when the length of a hose is required which is longer than the maximum length of the new hose, an intermediate hose fitting is required as the length of the hose is limited in the transportation of hose or in the maintenance of hose.

It is an object of the present invention to provide a quick hose fitting in which the connection of a hose to the fitting is complete by simply inserting the hose into the fitting.

An additional object of this invention is to provide a hose fitting to which a hose is connected without inflicting damage on the hose and without twisting the hose and in which work efficiency is enhanced.

A further object is to provide a hose fitting in which the internal circumferential edge bites on the hose when no fluid pressure is applied to the fitting and therefore the hose can be prevented from coming out of the fitting even if the hose is pulled axially outwardly.

SUMMARY OF THE INVENTION

In accordance with an important aspect of the present invention, there is provided a hose fitting comprising:

a first cylindrical member having a small diameter bore portion and a large diameter bore portion connected to said small diameter bore portion, the small diameter bore portion being formed with an axial small bore extending therethrough and the large diameter bore portion being formed with an axial large bore extending therethrough;

a second cylindrical member axially slidable within said large diameter bore portion of said first cylindrical member and having a radial flange portion and an axial tubular portion extending from said radial flange portion, the radial flange portion being provided with a sealing member and the axial tubular portion being formed with a through bore communicating with said axial small bore of said small diameter bore portion of said first cylindrical member and provided with a sealing member;

a sleeve provided within said large diameter bore portion and having an inclined surface;

a collet provided between said second cylindrical member and said sleeve and having an outer surface engageable with said inclined surface of said sleeve and radially constrictible when moving axially within said sleeve, the collet being further formed at its inner circumferential portion with a first annular projection with an inner circumferential edge having an inner diameter equal to or smaller than the outer diameter of said hose and formed with a plurality of second annular projections each having a land portion having an inner diameter equal to or greater than the inner diameter of said inner circumferential edge;

said inner circumferential edge of said collet being adapted to bite on said hose when no internal fluid pressure is applied within said small diameter bore portion of said first cylindrical member and when said hose is pulled out axially outwardly;

said hose being firmly fixed between said collet and said axial tubular portion of said second cylindrical member by axial outward movement of said collet when an internal fluid pressure is applied within said small diameter bore portion of said first cylindrical member; and a stop member received in said large diameter bore portion and adapted to limit axial movement of said sleeve and collet.

In accordance with the present invention, the inner circumferential edge of said collet bites on the hose when no internal fluid pressure is applied within the small diameter bore portion of the first cylindrical member and when the hose is pulled out axially outwardly. Therefore, even if the hose were pulled axially outwardly before the connection is complete, the hose can be effectively prevented from coming out of the hose.

In addition, in accordance with the present invention, the hose is firmly fixed between the collet and the axial tubular portion of the second cylindrical member by axial outward movement of the collet when an internal fluid pressure is applied within the small diameter bore portion of the first cylindrical member. Therefore, by a single operation that the hose is inserted into the hose, the hose can be connected to the fitting when an internal fluid pressure is applied to the hose. In addition, since the hose is connected by simply inserting it into the fitting, the hose can be connected without inflicting damage on the hose and without twisting the hose and the work efficiency can be enhanced.

BRIEF DESCRIPTION OF THE DRAWINGS

The drawbacks of a conventional hose fitting and the features and advantages of a hose fitting according to the present invention will be more clearly understood from the following description taken in conjunction with the accompanying drawings:

FIG. 2(*b*) is a view similar to FIG. 2(*a*) showing the hose connected to the hose fitting by the axial and outward movement of the core member shown in FIG. 2(*a*) from the position of FIG. 2(*a*);

FIG. 8(*a*) is an enlarged part-sectional view of the crimping ring shown in FIG. 6;

FIG. 8(*b*) is an end view of the crimping ring;

FIG. 9 is a part-sectional view of the stop screw shown in FIG. 6;

FIG. 10 is a part-sectional view of another embodiment of the crimping ring shown in FIG. 6;

FIG. 14(*b*) is a longitudinal sectional view showing a hose connected to the conventional hose fitting of FIG. 14(*a*)

DESCRIPTION OF THE PREFERRED EMBODIMENTS

Referring now in greater detail to the drawings and initially to FIGS. 1 to 4, there is shown a hose fitting 21 constructed in accordance with a first embodiment of the present invention. The hose fitting 21 comprises a body 22 as a first cylindrical member and a core member 24 as a second cylindrical member which is disposed in coaxial relationship to the body 22. The body 22 of the hose fitting 21 has an axially inner small diameter bore portion 22*a* formed with an axially inner small bore 22*a*' extending therethrough and a male thread 22*a*" for connecting the body 22 to another part of the fluid system (not shown), and further has an axially outer large diameter bore portion 22*b* connected to the small diameter bore portion 22*a* and formed with an axially outer large bore 22*d* extending therethrough.

Figure 3:
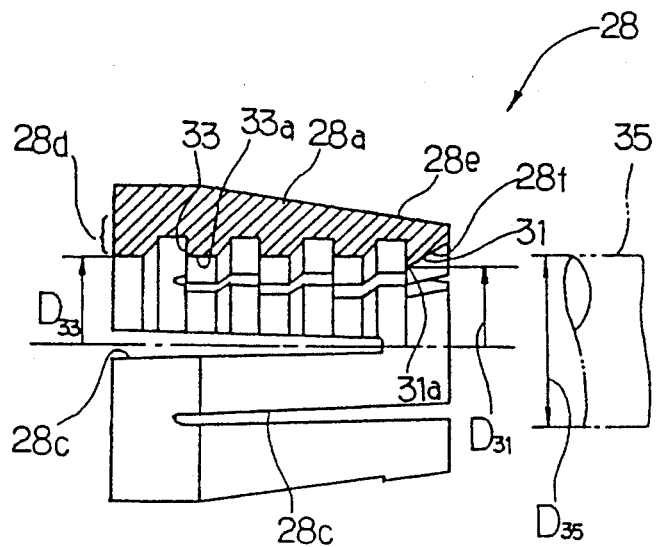
FIG. 3 is an enlarged part-sectional view showing the collet of FIG. 1.
Figure 4:
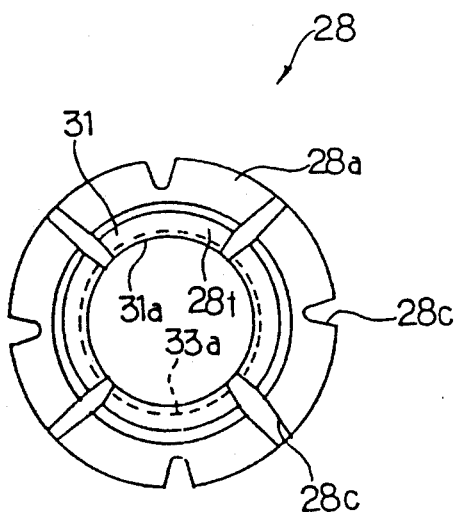
FIG. 4 is an end view of the collet.

The core member 24 of the hose fitting 21 has a radial flange portion 24a axially slidable within the bore 22d of the large diameter bore portion 22b, and an axial tubular portion 24b extending axially outwardly from the radial flange portion 24a and formed with an axial through bore 24c communicating with the axially inner bore 22a' of the small diameter bore portion 22a. An O-ring 25 is received in a circumferential groove formed in the flange portion 24a of the core member 24 to form a seal between the large diameter bore portion 22b of the body 22 and the flange portion 24a of the core member 24. The large diameter bore portion 22b of the body 22 is provided at its axially outer end portion 22c with a cylindrical retaining sleeve 26. The cylindrical sleeve 26 has its outer surface received in a recess 22e in the large diameter bore portion 22b, and the axial movement of the cylindrical sleeve 26 is limited by an annular stop ring 30 received in a circumferential groove 22f in the large diameter bore portion 22b. The cylindrical sleeve 26 has a radially inner frustoconical surface 26a narrowing toward the outer end portion 22c of the large diameter bore portion 22b. A cylindrical collet 28 made of polyacetal is provided within the large diameter bore portion 22b of the body 22, and has a radially outer frustoconical surface 28a narrowing toward the outer end portion 22c of the large diameter bore portion 22b at an angle corresponding to the angle of the inner frustoconical surface 26a of the sleeve 26 and engaging the inner frustoconical surface 26a. It is noted that the collet 28 may also be made of synthetic resin such as nylon 6, nylon 66 and metal such as steel. The collet 28 is constricted radially inwardly when axially outwardly moving within the sleeve 26. As shown in FIGS. 3 and 4, the collet 28 is formed with a plurality of axial slits 28c so that the collet 28 can maintain its form and constrict radially inwardly even under constricting and crimping load. The collet 28 is provided at its axially outer end 28e adjacent to the sleeve 26 with an inclined surface 28f widening toward the sleeve 26.

The inner circumferential portion 28d of the collet 28 is constituted by a first annular projection 31 with an inner circumferential edge 31a, and second annular projections 33 each having an inner circumferential land portion 33a. The inner diameter $D_{33}$ of the inner circumferential land portions 33a of the second annular projections 33 is equal to or greater than the inner diameter $D_{31}$ of the inner circumferential edge 31a of the first annular projection 31. In this embodiment, the inner diameter $D_{33}$ is greater than the inner diameter $D_{31}$. Although in this embodiment the inner circumferential edge 31a comprises one inner circumferential edge, it is noted that it may also be comprised of a plurality of inner circumferential edges.

As shown in FIG. 2(a), reference numeral 35 is a high-pressure hose of composite construction, which comprises an inner tube 36 made of nylon resin, an intermediate reinforcing layer 37 made of polyester fiber, and an outer cover 38 made of polyurethan rubber.

Reference numeral 39 denotes an O-ring received in a circumferential groove formed in the axial tubular portion 24b of the core member 24 in opposing relationship to the second annular projections 33 of the collet 28. The O-ring 39 is adapted to form a seal between the axial tubular portion 24b and the inner tube of a hose 31 inserted on the axial tubular portion 24b.

As shown in FIG. 2(a), the hose 35 passes from the large diameter bore portion 22b toward the small diameter bore portion 22a, and is inserted into a hose insertion space 29 between the axial portion 24b of the core member 24 and the collet 28 until the hose end abuts the flange portion 24a of the core member 24. When the hose 35 is pulled axially outwardly with the condition that no internal fluid pressure is applied to the small diameter bore portion 22a, the inner circumferential edge 31a of the first annular projection 31 bites on the outer circumferential portion 35a of the hose 35. Consequently, the hose 35 resists against the axial and outward force and is effectively prevented from coming out of the hose fitting 21.

If an internal pressure is applied through the bore 22a' to the axially inner end surface of the core member 24, the core member 24 is caused to move axially outwardly toward the sleeve 26. As shown in FIG. 2(b), the axial and outward movement of the core member 24 from the fully inserted position of FIG. 2(a) now causes the collet 28 to be moved axially outwardly so as to bring the outer frustoconical surface 28a of the collet 28 into engagement with the inner frustoconical surface 26c of the sleeve 26. As a result of the movement of the collet 28, the collet 28 is constricted radially inwardly so that the hose 35 is crimped by the collet 28 and the axial tubular portion 24c of the core member 24.

The operation of the hose fitting 21 constructed as described above will hereinafter be described in detail.

If, as shown in FIG. 2(a), the hose 35 is inserted within the hose insertion space 29 between the axial portion 24b of the core member 24 and the collet 28 until the hose end 35a abuts the flange portion 24a of the core member 24, the hose end 35a engages with the inclined surface 28f of the collet 28 and the collet end 28e is expanded radially outwardly. Since the collet 28 is provided at its inner circumferential portion 28d with the inner circumferential edge 31a having an inner diameter $D_{31}$ smaller than the outer diameter $D_{35}$ of the hose 35, the hose 35 is engaged with the inner circumferential edge 31a by the restoring force of the collet 28. If the hose 35 is pulled axially outwardly with the condition that no internal fluid pressure is applied to the small diameter bore portion 22a, the inner circumferential edge 31a of the first annular projection 31 bites on the outer circumferential portion 35a of the hose 35. Consequently, the hose 35 resists against the axial and outward force and is effectively prevented from coming out of the hose fitting 21. For this reason, even if oil adheres to the outer circumferential portion 35a of the hose 35 when the hose 35 is connected to the hose fitting, the inner circumferential edge 31a will bite on the hose 35 and the hose 35 will not come out of the hose fitting.

In addition, since the collet 28 is provided at its inner circumferential portion 28d with the second annular projections 33 having an inner diameter $D_{33}$ equal to or greater than the inner diameter $D_{31}$ of the inner circumferential edge 31a, if the internal fluid pressure is applied to the flange portion 24a of the core member 24, as shown in FIG. 2(a), the core member 24 is caused to move axially outwardly toward the sleeve 26, the outer frustoconical surface 28a of the collet 28 is brought into engagement with the inner frustoconical surface 26c of the sleeve 26, and the collet 28 is constricted radially inwardly so that the hose 35 is crimped by the inner circumferential land portions 33a of the second annular projections 33. In this way, the hose 35 is firmly crimped by the hose fitting 21, and therefore there is no leak of the fluid within the hose fitting 21. In addition, since the inner circumferential land portions 33a of the second annular projections 33 are wide and bite on the hose outer circumferential portion 35a along the axial length of the collet 28, there is no damage to the hose outer circumferential portion 35a. The hose 35 is simply inserted into the hose fitting 21 as arranged in FIG. 2(a) and is connected to the hose fitting 21 only by the internal pressure within the small diameter bore portion 22a. Therefore, the hose fitting 21 according to the present invention requires no tools for crimping, and the hose end can be very easily connected to the hose fitting 21.

When the hose fitting 21 is in the fully inserted position of FIG. 2(a), the hose 35 is freely rotatable with respect to the core member 24 and the body 22 of the hose fitting 21. Therefore, the hose fitting 21 can be connected to a high-pressure generating apparatus by screwing the body 22 of the hose fitting 21 into the apparatus without twisting the hose 35.

After the hose 35 is connected to the hose fitting 21, the hose 35, together with the sleeve 26, are freely rotatable with respect to the body 22 of the hose fitting 21 if the internal pressure is zero. Therefore, the hose fitting 21 can also be connected to a high-pressure generating apparatus by screwing the fitting body 22 into the apparatus without twisting the hose 35, even after the hose 35 is crimped by the hose fitting 21.

Figure 5:
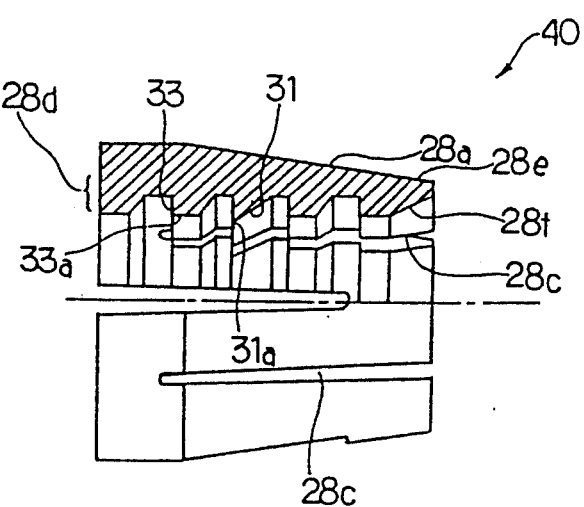
FIG. 5 is a longitudinal side view, partly in section, showing a collet of a second embodiment of the present invention.
Figure 6:
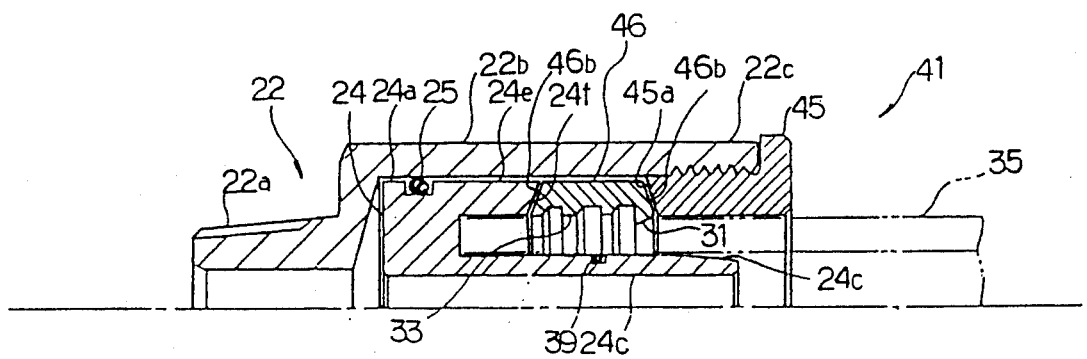
FIG. 6 is a longitudinal side view, partly in section, showing a hose fitting constructed in accordance with a third embodiment of the present invention.
Figure 7:
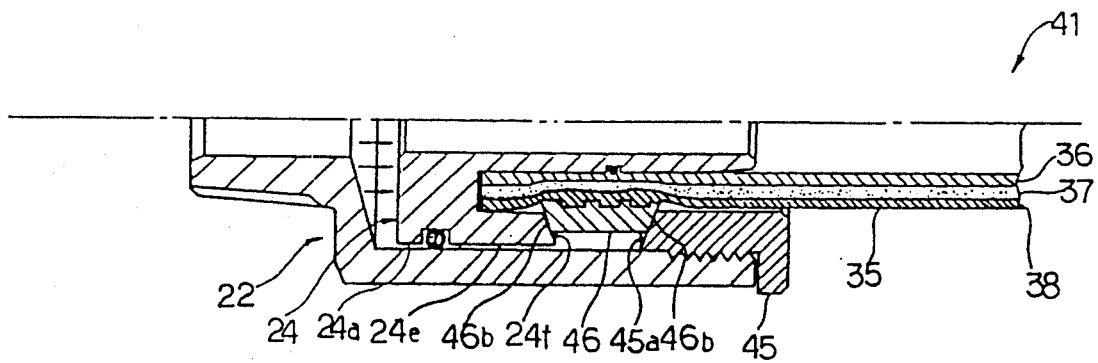
FIG. 7 is a fragmentary longitudinal sectional view showing a hose connected to the hose fitting by the axial and outward movement of the core member of FIG. 6 from the position of FIG. 6.

FIG. 5 shows a collet 40 of a second embodiment of the hose fitting according to the present invention. The second embodiment is substantially the same as the first embodiment of FIG. 1 except the collet 40. In FIG. 5, the same reference numbers will be applied to the same parts as the first embodiment. In the second embodiment, the collet 40 is provided at the axial and central portion of the inner circumferential portion 28d thereof with a first annular projection 31. The second annular projections 33 of the collet 40 are disposed in the opposite sides of the first annular projection 31. The collet 40 will have the same effect as the collet 28 of the first embodiment of FIG. 1.

FIGS. 6 through 9 illustrate a third embodiment of the hose fitting according to the present invention. The same reference numbers will be applied to the same parts as the first embodiment. In the third embodiment, a hose fitting 41 is provided with a stop screw 45, instead of the sleeve 26 and stop ring 30 of the first embodiment. The stop screw 45 is screwed into the internally threaded portion of the axially outer end portion of a main body 22 of the fitting 41. As shown in FIGS. 8(a) and 8(b), the hose fitting 41 is further provided with an annular crimping ring 46, instead of the collet 28 of the first embodiment. The annular crimping ring 46 is formed with an axially extending cutout 46a so that it can be radially expandable and constrictible, and has inclined end faces 46b and 46b narrowing outward at angle θ of 60° relative to the longitudinal center axis of the ring 46. The axially outer inclined face 46b of the crimping ring is engageable with an inclined face 45a of the stop screw 45 having substantially the same angle of taper as the inclined end face 46b. The annular crimping ring 46 is further formed at its inner circumferential portion 46c with a first annular projection 31 and a plurality of second annular projections 33. In this embodiment, the second annular projections 33 comprise three projections. As shown in FIG. 10, the first annular projection 31 may also be disposed at the axial and central portion of the inner circumferential portion 46c. Also, a core member 24 of this embodiment is provided with a receiving portion 24e which extends axially outward from a radial flange portion 24a and has an inclined end face 24f engageable with the axially inner inclined end face 46b of the crimping ring 46. The inclined end face 24f of the receiving portion 24e has substantially the same angle of taper as the inclined end face 46b of the crimping ring 46. Since the parts other than the parts described above are substantially the same as the first embodiment, a description will not be given.

Figure 1:
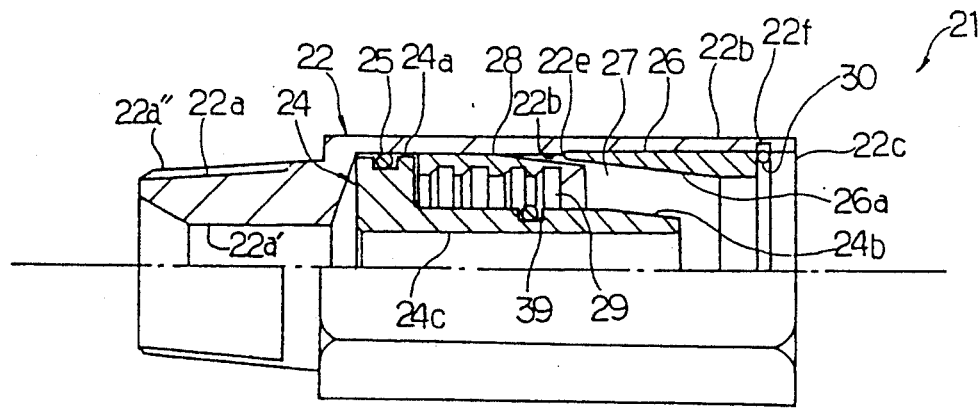
FIG. 1 is a longitudinal side view, partly in section, showing a hose fitting constructed in accordance with a first embodiment of the present invention.
Figure 2:
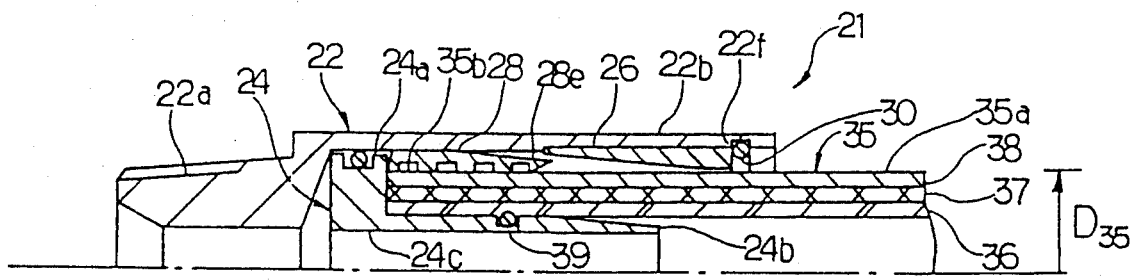
FIG. 2(*a*) is a fragmentary longitudinal sectional view showing a hose inserted to the fully inserted position wherein the hose end abuts the flange portion of the core member shown in FIG. 1.
Figure 2:
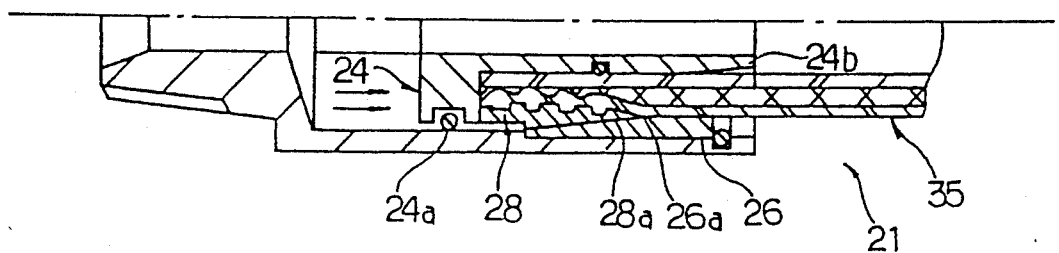
Figure 11:
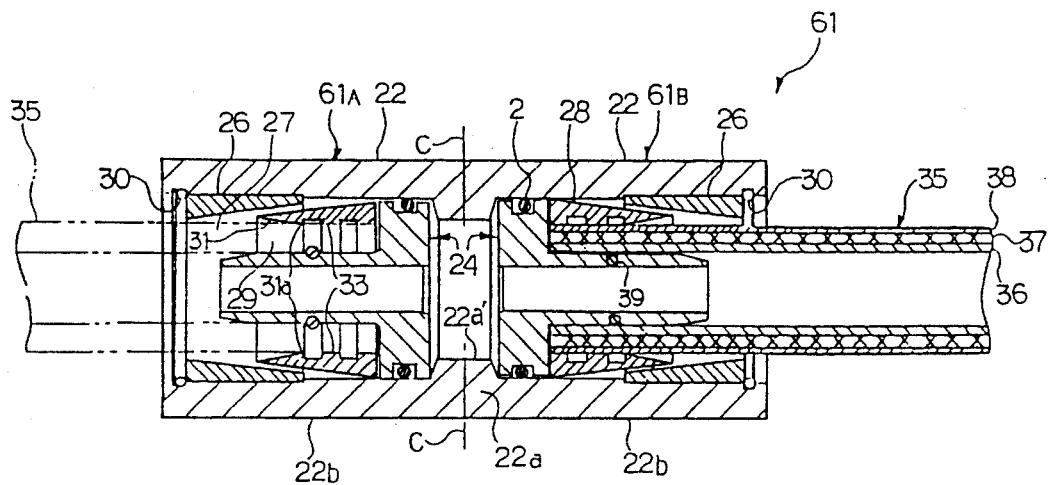
FIG. 11 is a longitudinal sectional view showing an intermediate hose fitting constructed in accordance with a fourth embodiment of the present invention.
Figure 12:
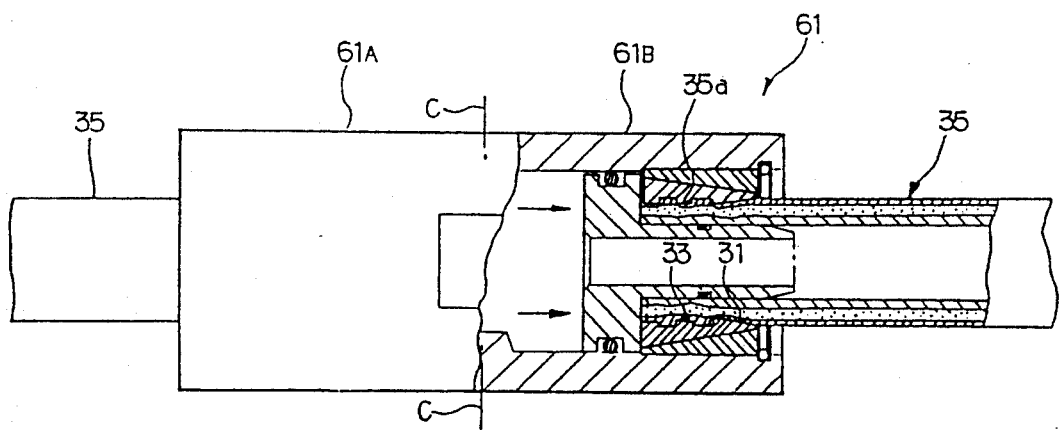
FIG. 12 is a part-sectional view showing the hose connected to the hose fitting by the axial and outward movement of the core member shown in FIG. 11 from the position of FIG. 11.
Figure 13:
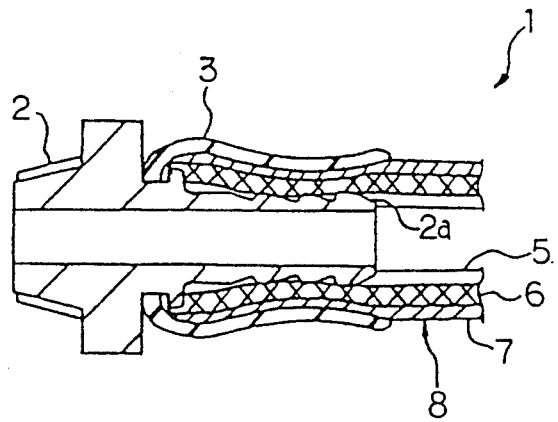
FIG. 13 is a longitudinal sectional view of a conventional hose fitting.
Figure 14A:
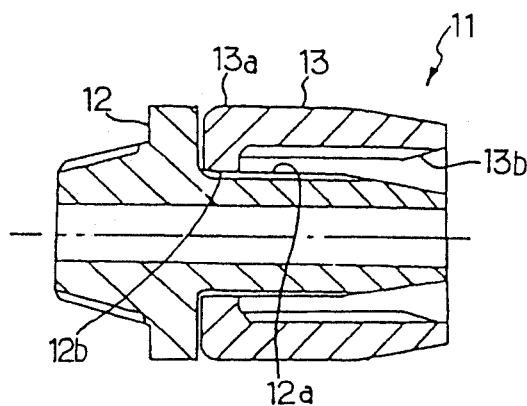
FIG. 14(*a*) is a longitudinal sectional view of another conventional hose fitting.
Figure 14B:
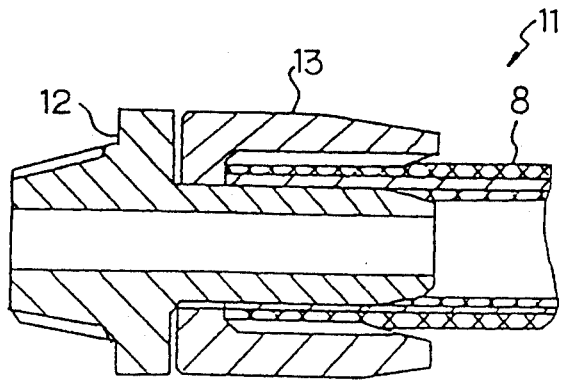
Figure 15:
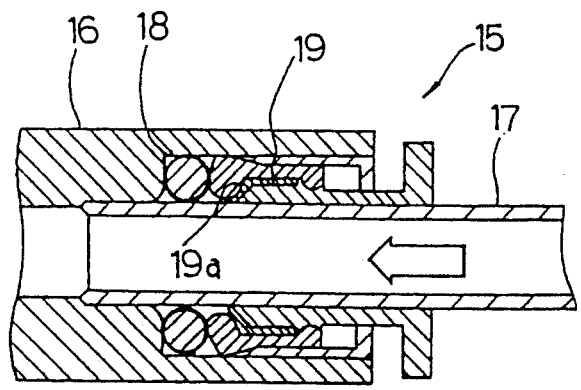
FIG. 15 is a longitudinal sectional view of still another conventional tube fitting.

FIGS. 11 and 12 show an intermediate hose fitting 61 constructed in accordance with the present invention. The parts and members substantially identical to those of the first embodiment shown in FIG. 1 are designated by like reference numerals for avoiding the detailed description. The intermediate hose fitting 61 comprises a first hose fitting portion 61A and a second hose fitting portion 61B which are symmetrical in construction with respect to the center line C—C of FIG. 11 and which are connected through a central portion 22a with each other. The right side portion of FIG. 11 illustrates a hose 35 inserted to the fully inserted position wherein the hose distal end abuts the flange portion of a core member 24, while FIG. 12 illustrates the hose distal end which is firmly fixed to the second hose fitting portion 61B by axial inward movement of a collet 28 from the fully inserted position of FIG. 11. In the case the hose 35 is damaged, the hose 35 is cut to remove the damaged portion and the remaining two hoses 31 can be easily connected through the intermediate hose fitting 61 with each other. The intermediate hose fitting 61 according to the present invention requires no tools to effect the connection of two separate hoses to the hose fitting 61, since they are simply inserted into the opposite fitting portions 61A and 61B. As a result, the connection of one hose to another hose can be made rapidly, and the length of the hose at the time of transportation can be shortened.

From the foregoing description, it will be seen that an improved hose fitting, which solves all of the drawbacks inherent in the aforementioned conventional hose fitting, is provided in accordance with the present invention.

While certain representative embodiments and details have been shown for the purpose of illustrating the invention, it will be apparent to those skilled in this art that various changes and modifications may be made therein without departing from the scope of the invention.

What we claim is:

1. A hose fitting comprising:
 a first cylindrical member having a small diameter bore portion and a large diameter bore portion connected to said small diameter bore portion, the small diameter bore portion being formed with an axial small bore extending therethrough and the large diameter bore portion being formed with an axial large bore extending therethrough;
 a second cylindrical member axially slidable within said large diameter bore portion of said first cylindrical member and having a radial flange portion and an axial tubular portion extending from said radial flange portion, the radial flange portion being provided with a sealing member and the axial tubular portion being formed with a through bore communicating with said axial small bore of said small diameter bore portion of said first cylindrical member and provided with a sealing member;

a sleeve provided within said large diameter bore portion and having an inclined surface;

an axially movable and radially constrictible collet provided between said second cylindrical member and said sleeve and having an outer surface engageable with said inclined surface of said sleeve, the collet being further formed at its inner circumferential portion with a first annular projection with an inner circumferential edge having an inner diameter no greater than the outer diameter of said hose and formed with a plurality of second annular projections each having a land portion having an inner diameter at least equal to the inner diameter of said inner circumferential edge;

said inner circumferential edge of said collet being adapted to bite on said hose when no internal fluid pressure is applied within said small diameter bore portion of said first cylindrical member and when said hose is pulled out axially outwardly;

said hose being firmly fixed between said collet and said axial tubular portion of said second cylindrical member by axial and outward movement of said collet which is caused by axial and outward movement of said second cylindrical member when an internal fluid pressure is applied within said small diameter bore portion of said first cylindrical member; and a stop member received in said large diameter bore portion and adapted to limit axial movement of said sleeve and collet.

2. A hose fitting as set forth in claim 1, wherein said inner circumferential edge of said collet is disposed at an axially outer end of said collet.

3. A hose fitting as set forth in claim 1, wherein said inner circumferential edge of said collet is disposed at an axial and central portion of said collet.

4. A hose fitting as set forth in claim 1, wherein said inner circumferential edge of said collet is comprised of a plurality of inner circumferential edge.

5. A hose fitting as set forth in claim 1, wherein said inclined surface of said sleeve is inclined, in an axially outward direction, toward the axis of said first cylindrical member, and said outer surface of said collet is inclined, in an axial outward direction, toward the axis of said first cylindrical member.

6. A hose fitting comprising a pair of first and second hose fitting portions which are symmetrical in construction and connected with each other, each fitting portion comprising:

a first cylindrical member having a small diameter bore portion and a large diameter bore portion connected to said small diameter bore portion, the small diameter bore portion being formed with an axial small bore extending therethrough and the large diameter bore portion being formed with an axial large bore extending therethrough;

a second cylindrical member axially slidable within said large diameter bore portion of said first cylindrical member and having a radial flange portion and an axial tubular portion extending from said radial flange portion, the radial flange portion being provided with a sealing member and the axial tubular portion being formed with a through bore communicating with said axial small bore of said small diameter bore portion of said first cylindrical member and provided with a sealing member;

a sleeve provided within said large diameter bore portion and having an inclined surface;

an axially movable and radially constrictible collet provided between said second cylindrical member and said sleeve and having an outer surface engageable with said inclined surface of said sleeve, the collet being further formed at its inner circumferential portion with a first annular projection with an inner circumferential edge having an inner diameter no greater than the outer diameter of said hose and formed with a plurality of second annular projections each having a land portion having an inner diameter at least equal to the inner diameter of said inner circumferential edge;

said inner circumferential edge of said collet being adapted to bite on said hose when no internal fluid pressure is applied within said small diameter bore portion of said first cylindrical member and when said hose is pulled out axially outwardly;

said hose being firmly fixed between said collet and said axial tubular portion of said second cylindrical member by axial and outward movement of said collet which is caused by axial and outward movement of said second cylindrical member when an internal fluid pressure is applied within said small diameter bore portion of said first cylindrical member; and a stop member received in said large diameter bore portion and adapted to limit axial movement of said sleeve and collet.

7. A hose fitting comprising:

a first cylindrical member having a small diameter bore portion and a large diameter bore portion connected to said small diameter bore portion, the small diameter bore portion being formed with an axial small bore extending therethrough and the large diameter bore portion being formed with an axial large bore extending therethrough;

a second cylindrical member axially slidable within said large diameter bore portion of said first cylindrical member and having a radial flange portion and an axial tubular portion extending from said radial flange portion, the radial flange portion being provided with a sealing member and the axial tubular portion being formed with a through bore communicating with said axial small bore of said small diameter bore portion of said first cylindrical member and provided with a sealing member;

stopping means received in said large diameter bore portion; and a crimping ring provided between said second cylindrical member and said stopping means, the crimping ring being formed at its inner circumferential portion with a first annular projection with an inner circumferential edge having an inner diameter no greater than the outer diameter of said hose and formed with a plurality of second annular projections each having a land portion having an inner diameter at least equal to the inner diameter of said inner circumferential edge;

said inner circumferential edge of said crimping ring being adapted to bite on said hose when no internal fluid pressure is applied within said small diameter bore portion of said first cylindrical member and when said hose is pulled out axially outwardly;

said hose being firmly fixed between said crimping ring and said axial tubular portion of said second cylindrical member by axial and outward movement of said crimping ring when an internal fluid pressure is applied within said small diameter bore portion of said first cylindrical member; and axial movement of said second cylindrical member and said crimping ring being limited by said stopping means.

8. A hose fitting as set forth in claim 7, wherein said inner circumferential edge of said crimping ring is disposed at an axially outer end of said crimping ring.

9. A hose fitting as set forth in claim 7, wherein said inner circumferential edge of said crimping ring is disposed at an axial and central portion of said crimping ring.

10. A hose fitting as set forth in claim 7, wherein said inner circumferential edge of said collet is comprised of a plurality of inner circumferential edge.

11. A hose fitting as set forth in claim 7, wherein said crimping ring is formed with a cutout axially extending therethrough.

* * * * *